(12) United States Patent
Brady et al.

(10) Patent No.: US 11,981,112 B2
(45) Date of Patent: May 14, 2024

(54) METHODS FOR FORMING AND TESTING A COMPOSITE COMPONENT

(71) Applicant: THE BOEING COMPANY, Chicago, IL (US)

(72) Inventors: Steven Kenneth Brady, Renton, WA (US); Marc Joel Piehl, Renton, WA (US); Matthew McKinley Whitmer, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/492,738

(22) Filed: Oct. 4, 2021

(65) Prior Publication Data

US 2023/0104854 A1 Apr. 6, 2023

(51) Int. Cl.
*B32B 3/30* (2006.01)
*B32B 7/12* (2006.01)
*B32B 15/04* (2006.01)
*B32B 41/00* (2006.01)

(52) U.S. Cl.
CPC ............... *B32B 3/30* (2013.01); *B32B 7/12* (2013.01); *B32B 15/04* (2013.01); *B32B 41/00* (2013.01); *B32B 2250/03* (2013.01); *B32B 2605/18* (2013.01)

(58) Field of Classification Search
CPC .. B32B 3/30; B32B 7/12; B32B 15/04; B32B 41/00; B32B 2250/03; B32B 2605/18
See application file for complete search history.

(56) References Cited

U.S. PATENT DOCUMENTS

| 4,257,998 | A | * | 3/1981 | Diepenbrock, Jr. | ...... B32B 3/12 428/116 |
|---|---|---|---|---|---|
| 6,197,402 | B1 | * | 3/2001 | Miller | ................. B31D 3/0207 428/116 |
| 7,507,312 | B2 | | 3/2009 | Bossi | |
| 10,048,230 | B2 | | 8/2018 | Stewart | |
| 2003/0079552 | A1 | | 5/2003 | Bossi | |
| 2015/0128717 | A1 | | 5/2015 | May | |
| 2015/0165724 | A1 | * | 6/2015 | Cox | ........................ B32B 7/12 156/196 |
| 2016/0167336 | A1 | | 6/2016 | Shuert | |
| 2020/0023606 | A1 | | 1/2020 | Sekine | |
| 2021/0114319 | A1 | | 4/2021 | Anderson | |
| 2021/0114713 | A1 | | 4/2021 | Anderson | |
| 2021/0221493 | A1 | | 7/2021 | Anderson | |
| 2021/0239585 | A1 | | 8/2021 | Hart | |

OTHER PUBLICATIONS

Extended European Search Report for EP 22183915.2-1107, dated Dec. 8, 2022.
U.S. Appl. No. 63/127,126, filed Dec. 17, 2020.

* cited by examiner

*Primary Examiner* — Alicia J Weydemeyer
*Assistant Examiner* — Laura B Figg
(74) *Attorney, Agent, or Firm* — Joseph M. Butscher; The Small Patent Law Group LLC

(57) ABSTRACT

A component assembly includes a core including a main body having a first surface and a second surface opposite from the first surface. One or more recessed cells are formed in each of the first surface and the second surface of the main body. The one or more recessed cells formed in the first surface extend toward the second surface. The one or more recessed cells formed in the second surface extend toward the first surface. A first layer is secured to the core at a first adhesive layer. A second layer is secured to the core at a second adhesive layer.

20 Claims, 2 Drawing Sheets

METHODS FOR FORMING AND TESTING A COMPOSITE COMPONENT

FIELD OF THE DISCLOSURE

Examples of the subject disclosure generally relate to methods for forming and testing a composite component, such as may be installed on an aircraft.

BACKGROUND OF THE DISCLOSURE

Aircraft, such as commercial aircraft, military aircraft, unmanned aerial vehicles (UAVs) often include various components formed of composite structures, such as can include carbon-based materials, honeycomb structures, and/or the like. Secondarily-bonded primary structures, such as waffle grid structures, typically require testing to ensure that bonds therein are adequately strong in order for the structures to be certified for use in aircraft.

However, proving that bondlines are strong using known methods is often technologically, and/or financially challenging and/or impossible. As an example, laser bond inspection can be used to prove that bondlines are strong, thereby allowing for a secondarily-bonded primary structure to be certified. Laser bond inspection can typically be used with respect to components having a thickness that does not exceed a certain magnitude, such as 0.5 inches. However, various secondarily-bonded primary structures are too thick to test with laser bonding inspection.

Existing methods to test bond strength in secondarily-bonded primary structures typically involve proof loading the bondlines in the structure. For a large structure, such as a wing skin, proof loading the numerous bondline areas is difficult. For example, mechanically stressing every production wing to test a sufficient portion of the total bonded area is time and labor intensive, and, as such, is likely not feasible for efficiently manufacturing an aircraft.

SUMMARY OF THE DISCLOSURE

A need exists for an assembly that can be used as a secondarily-bonded primary structure that can be effectively inspected by laser bond inspection.

With that need in mind, certain examples of the subject disclosure provide a component assembly including a core including a main body having a first surface and a second surface opposite from the first surface. One or more recessed cells are formed in each of the first surface and the second surface of the main body. The one or more recessed cells formed in the first surface extend toward the second surface. The one or more recessed cells formed in the second surface extend toward the first surface. A first layer is secured to the core at a first adhesive layer. A second layer is secured to the core at a second adhesive layer.

In at least one example, the core is formed of a composite material.

In at least one example, the one or more recessed cells formed in the first surface do not extend into or through the second surface. The one or more recessed cells formed in the second surface do not extend into or through the first surface.

In at least one example, the one or more recessed cells do not extend through an entire thickness of the core.

A laser device is configured to perform laser bond inspection at one or more areas defined by the one or more recessed cells to determine a strength of the first adhesive layer. The first layer can be formed of a composite material.

The laser device is also configured to perform the laser bond inspection at the one or more areas defined by the one or more recessed cells to determine a strength of the second adhesive layer. The second layer can be formed of a composite material.

In at least one example, the one or more recessed cells include an opening formed through the surface, one or more walls, and a base connected to the one or more walls. The base is recessed into the main body of the core a depth that is less than a thickness of the core. In at least one example, the base is flat and parallel with the opposite surface. The one or more walls can be outwardly flared.

Certain examples of the subject disclosure provide a method for testing one or more bondlines of a component assembly. The method includes forming one or more recessed cells in a first surface of a main body of a core, wherein the one or more recessed cells in the first surface extend toward a second surface that is opposite from the first surface; forming one or more recessed cells in the second surface of the main body of the core, wherein the one or more recessed cells in the second surface extend toward the first surface; securing a first layer to the core at a first adhesive layer; and securing a second layer to the core at a second adhesive layer.

DETAILED DESCRIPTION OF THE DISCLOSURE

Figure 1:
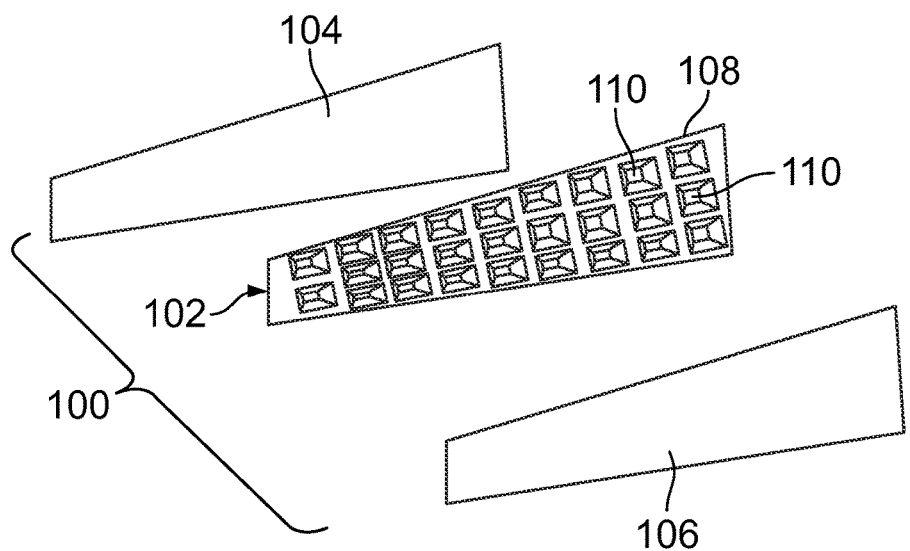
FIG. 1 illustrates a perspective exploded view of a component assembly, according to an example of the subject disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the subject disclosure provide a component assembly including a core, which can be formed of a composite material, such as a carbon-based composite material. The composite core includes one or more recessed cells, such as pockets, formed through a first surface toward a second surface (opposite from the first surface). The recessed cells do not extend into and through the second surface. In at least one embodiment, a first layer, such as a first skin, is disposed over the first surface, and a second lateral, such as a second skin, is disposed over the second surface. The composite core is disposed between the first layer and the second layer. In at least one embodiment, the first layer and the second layer are formed of a composite material, which can be the same composite material that forms the composite core. The recessed cells can be formed through either the first surface or the second surface, but do not extend through an entire thickness of the composite core. The recessed cells provide areas of reduced thickness that allow for non-destructive inspection of one or more bonds between the composite core and one or both of the first layer and/or the second layer (but not necessarily at the same location). Examples of the subject disclosure provide a method of reducing a bonded component thickness to allow for non-destruction inspection thereof.

Certain examples of the subject disclosure provide methods for locally reducing adherend and assembly thickness to enable laser bond inspection, which is able to prove that bondlines of the assembly are strong. As such, the assembly can be certified as a secondarily-bonded primary structure.

Certain examples of the subject disclosure enable laser inspection to prove that bondlines of an assembly are strong by testing in thin areas, thereby eliminating or otherwise reducing a necessity to test an entirety of the bonded area. Instead, a reduced amount of the bondlines are tested through laser bonding inspection to demonstrate that the entire bonded structure is strong and certifiable. The examples of the subject disclosure are configured to allow a structure to be certified for flight using non-destructive inspection, such as non-destructive laser bonding inspection.

In at least one example, a waffle grid includes three main steps: layup and curing of laminates, machining an inner grid member, and secondarily bonding the three laminate together. Recessed cells (such as partial thickness pockets) are formed in the core (such as the inner grid member). Laser bonding testing is performed at the areas of the recessed cells.

Certain examples of the subject disclosure provide methods that lower the cost of airframe primary composite structures. In general, primary structure is aircraft structure that significantly contributes to carrying flight, ground, or pressure loads.

Aircraft primary structure is comprised of many elements that together react to airplane loads and enable airplane functionality. Metallic airplanes have a widespread use of fasteners to attach individual primary element structural elements together. Composite airplanes typically use bonding to join individual primary structural elements together.

Metallic wing panels include skins and stringers fastened together, whereas composite wing panels have the skins and stringers bonded together. Cobonding and cocuring are two methods that produce certifiable structural structure bonding. Cobonded structures have an uncured structural element cured and bonded with structural adhesive to a pre-cured structural element in an autoclave. Cocured structures have both structural elements uncured, but bonded and cured together using an autoclave.

For bonded structure to be reliable and certifiable by certain regulatory agencies, bondlines must not fail (disbond) under aircraft loading. Disbond failure can be caused by the incorrect use of composite materials, use of the incorrect adhesive, poor surface preparation, foreign object debris, contamination or porosity in the bondline, and/or missing adhesive.

Typically, bondlines are not inspected for strength, but for the absence of defects. Ultrasonic non-destructive inspection is used to verify the absence of defects. Cobonded and cocured structures typically conform to document processes, specifications, verification, and approved manufacturing plans to ensure the bondlines will not fail. Ultrasonic non-destructive inspection can be used to verify that cobond and cocured bondlines are free of defects. Examples of certified cocured and cobonded primary structures include an empennage, a wing, a fuselage, and the like.

Secondary bonding is another method for bonding primary structural composites together. Secondary bonding includes pre-curing each structural element in an autoclave prior to bonding, then bonding the pre-cured elements together in an autoclave using a structural adhesive. As an example, wing panel waffle grid structures employ secondary bonding. Waffle grid structure can be manufactured using less expensive tooling, equipment and manufacturing processes compared to cobonded or cocured structures.

Laser bond inspection is able to proof test the bondline of complicated bonded parts, ensuring bondline strength and allowing certification to regulatory requirements. It has been found that laser bond inspection can detect weak bonds on a location-by-location basis, providing a way to proof load a bondline at specific locations.

FIG. 1 illustrates a perspective exploded view of a component assembly 100, according to an example of the subject disclosure. In at least one embodiment, the component assembly 100 is a composite component assembly formed of a composite material, such as a carbon-based composite material. Optionally, one or more portions of the component assembly 100 can be formed of metal, for example. The component assembly 100 can be used to form a portion of an aircraft, such as a portion of a wing, an empennage, a fuselage, or the like. Optionally, the component assembly 100 can be used to form various other structures, whether or not part of an aircraft.

The component assembly 100 includes a core 102 disposed between a first layer 104 and a second layer 106. The core 102 can be a composite component. In at least one embodiment, the core 102 is a waffle grid having a main body 108 and a plurality of recessed cells 110 formed in the main body 108. The core 102 can be sized and shaped differently than shown. The core 102 can include more or less recessed cells 110 than shown.

In at least one embodiment, the core 102 is formed of a composite material, such as a carbon-based composite material. The core 102 can be formed by laying up a plurality of different plies of the composite material. For example, the plies can be laid up at various angles, such as 0 degrees, 45 degrees, and 90 degrees. The core 102 can be cured. In at least one embodiment, the core 102 is a spacer that separates the first layer 104 from the second layer 106. Alternatively, at least a portion of the core 102 can be formed of a metal.

The first layer 104 can be an inner skin (or optionally an outer skin). The first layer 104 can also be formed of a composite material, which can be the same or different as the composite material that forms the core 102. The first layer 104 can be formed by laying up a plurality of different plies of the composite material. The first layer 104 can be formed of less plies than the core 102. For example, the first layer 104 can be formed from a plurality of 0 degree plies. Alternatively, at least a portion of the first layer 104 can be formed of a metal.

The second layer 106 can be an outer skin (or optionally an inner skin). The second layer 106 can also be formed of a composite material, which can be the same or different as the composite material that forms the core 102. The second layer 106 can be formed by laying up a plurality of different plies of the composite material. The second layer 106 can be formed of less plies than the core 102. For example, the second layer 106 can be formed from a plurality of 0 degree plies. Alternatively, at least a portion of the second layer 106 can be formed of a metal.

Optionally, the component assembly 100 can include more or less layers than shown. For example, the component assembly 100 can include the core 102 coupled to only one of the first layer 104 or the second layer 106. As another example, additional layers, such as at ends, sides, or over the first layer 104 and the second layer 106 can be used.

In at least one embodiment, the component assembly 100 can be a composite component assembly that provides a waffle grid structure. The core 102, the first layer 104, and the second layer 106 can each be formed by laying up a plurality of composite plies. The core 102 can be machined to form the recessed cells 110. The core 102, the first layer 104, and the second layer 106 can then be cured and bonded together. For example, the core 102 can be machined to form a pattern of recessed cells 110 (and optionally channels 116, thereby removing a substantial amount of material, and providing a lighter component assembly 100. The pattern can be defined by various criteria, such as pocket size for face sheet stability, solid laminate interface for rib and major fittings joints, axial members for strength and damage tolerance analyses. In at least one other embodiment, the component assembly 100 is not a waffle grid structure. In short, the component assembly 100 is not limited to a waffle grid structure.

In at least one example, portions of the core 102 are machined away to form the recessed cells 110. As another example, the recessed cells 110 can be integrally formed within the main body 108, instead of being separately machined.

Figure 2:
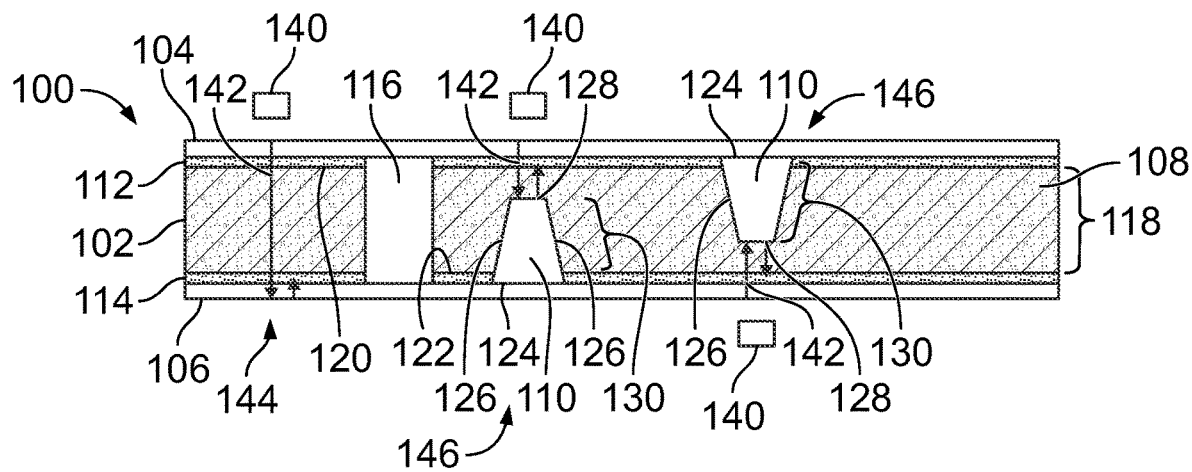
FIG. 2 illustrates a transverse cross-sectional view of a component assembly, according to an example of the subject disclosure.

FIG. 2 illustrates a transverse cross-sectional view of the component assembly 100, according to an example of the subject disclosure. In at least one embodiment, the core 102 is secured to the first layer 104 through a first adhesive layer 112, such as an epoxy. The core 102 is further secured to the second layer 106 through a second adhesive layer 114, such as an epoxy. The first adhesive layer 112 provides a first bondline between the core 102 and the first layer 104, and the second adhesive layer 114 provides a second bondline between the core 102 and the second layer 106.

As shown, the core 102 can include one or more channels 116 that extend through an entire thickness 118 of the core 102. That is, the channel 116 extends between and through a first surface 120 (such as upper surface) of the core 102, and into and through a second surface 122 (such as a lower surface) of the core 102. In this manner, the channel 116 provides an opening through the core 102. Optionally, the core 102 may not include any channel 116. The channel 116 is shown to contrast the differences with the recessed cells 110.

Each recessed cell 110 provides a pocket formed in the core 102. A recessed cell 110 extends into and through first surface 120 or the second surface 122, and extends toward the opposite surface, such as the other of the first surface 120 or the second surface 122. However, the recessed cell 110 does not extend into and through the opposite surface. For example, as shown in FIG. 2, a first recessed cell 110 extends through the first surface 120 toward the second surface 122, but does not extend into or through the second surface 122. Similarly, a second recessed cell 110 extends through the second surface 122 toward the first surface 120, but does not extend into or through the first surface 120. By forming recessed cells 110 in both the first surface 120 and the second surface 122 (toward, but not extending into respective opposite surfaces), areas of reduced thickness are established across both sides (relative to the first surface 120 and the second surface 122) of the component assembly 100, such that laser bond testing can be performed with respect to both the first adhesive layer 112 and the second adhesive layer 114 (instead of just one of the adhesive layers).

Instead, each recessed cell 110 extends through only a portion of the thickness 118 of the core 102. That is, each recessed cell 110 does not extend through an entirety of the thickness 118 of the core 102. In at least one embodiment, the recessed cells 110 extend into ⅔ or less of the thickness 118. As an example, the recessed cells 110 can extend a depth into the core 102 that is less than 0.5 inches, in order to facilitate effective laser bond testing.

The recessed cells 110 can be machined into (or optionally formed integrally with) the core 102. The recessed cells 110 include and/or are otherwise defined by an opening 124 formed through one of the first surface 120 or the second surface 122, walls 126, and a base 128 that connects to the walls 126. The base 128 is recessed into the main body 108 of the core 102 a depth 130 that is less than the thickness 118. As shown, the base 128 is flat and parallel with the first surface 120 and/or the second surface 122.

As shown, the walls 126 can be outwardly flared from the base 128 to the opening 124. The outward flare of the walls 126 increases the amount of material removed from the core 102, and thereby provides a light component assembly 100. Optionally, the walls 126 may not be flared, but may be orthogonal to the base 128.

A laser device 140 can be used to laser bond test the bondlines of the component assembly 100. The laser device 140 emits a laser beam toward the component assembly 100.

The laser device 140 is configured to inspect the bondlines, such as the first adhesive layer 112 and the second adhesive layer 114, at the areas 146 through laser bond inspection to verify strength thereof. In laser bond inspection, the laser device 140 generates a proof-loading shockwave by causing a high-energy laser to impinge on tape applied to the outer surface of the first layer 104, or the second layer 106. Some of the tape is ablated, generating a compressive, ultrasonic shockwave 142 in the assembly. The shockwave 142 passes through the first layer 104 (or the second layer 106), through the bondline (adhesive layer 112 or 114), through the core 102, reflects off the base 128 (such reflection converts the shockwave into a tensile stress wave), back through the core 102, and finally tests the strength of the bondline (adhesive layer 112 or 114). Once the shockwave 142 passes through the entire assembly and reflects back to the bondline (adhesive layer 112 or 114), a strong bond remains intact, whereas a weak bond will fail over the area of a circle of approximately 1 centimeter in diameter. Subsequent non-destructive inspection (for example, ultrasonic, radiographic, or the like) reveals whether or not the bondline broke, and hence whether or not the bond was sufficiently strong.

Structural materials attenuate ultrasonic shockwaves exponentially as a function of their thicknesses. Because the available laser energy has an upper limit, this limits the energy that can be invested into the shockwave 142, and hence the thickness of bonded structures which can be tested by laser bond inspection. In particular, beyond a certain thickness, there is not enough energy left in the shockwave to break even a weak bond once it is reached.

The recessed cells 110 provide the areas 146 where stackup of bonded materials (the core 102, adhesive 112 or 114, and either the first layer 104 or the second layer 106) is sufficiently thin that the laser bond inspection is effective. The recessed cells 110 at the areas 146 create paths having lengths that are sufficiently short to allow a laser bond inspection tension wave 142 to successfully test the bondlines at the areas 146. In contrast, the shockwave 142 may lose so much energy traversing the comparatively long path at area 144 that it would have insufficient energy to test the bond strength at adhesive layer 114.

It is not necessary to test an entirety of the bonded area to demonstrate that the entire bond (that is, the bondlines) is strong. Known areas of potential risk can be targeted in the design of the partial-thickness pockets (that is, the recessed cells 110). The recessed cells 110 can be distributed, by design, in enough locations to give high confidence that the entire bondline is strong.

During manufacturing, holes can be drilled through bonded stackups to enable attachment of components such as aircraft engine pylons. Certain examples of the subject disclosure take advantage of the drilling process to perform laser bond inspection. For example, when a hole is planned through the component assembly 100, which can be a bonded stackup, the hole can be drilled part way as a flat-bottom hole before finishing the drilling. In the example of a 100-ply wing skin bonded to a wing stringer flange, approximately 80% of the wing skin thickness can be removed, and then drilling stopped. The resulting flat-bottom hole can be used as a recessed cell 110 to perform laser bond testing on the bondline at such location. While the full-thickness stackup of the wing skin and stringer flange may be too thick for laser bond inspection due to ultrasonic attenuation, the stackup remaining after partial skin drilling can include the stringer flange thickness plus only a portion (for example, 20%) of the original skin thickness. This reduced total may be sufficiently thin to enable laser bond inspection. After laser bond inspection has been performed at the location, drilling of the hole may be completed.

Figure 3:
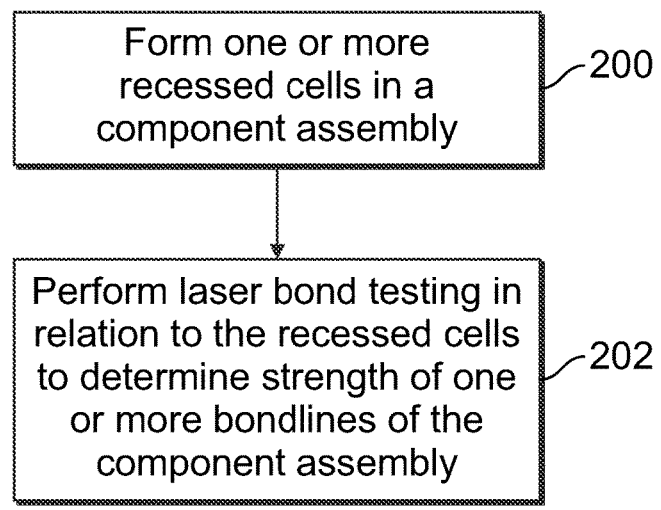
FIG. 3 illustrates a flow chart of a method of determining a strength of one or more bondlines of a component assembly, according to an example of the subject disclosure.

FIG. 3 illustrates a flow chart of a method of determining a strength of one or more bondlines of a component assembly, according to an example of the subject disclosure. Referring to FIGS. 1-3, at 200, one or more recessed cells 110 are formed the component assembly 100. At 202, laser bond testing is performed in relation to the recessed cells 110 (such as at the areas 146) to determine the strength of the bondline(s) (for example, the first adhesive layer 112 and/or the second adhesive layer 114) of the component assembly 100.

Figure 4:
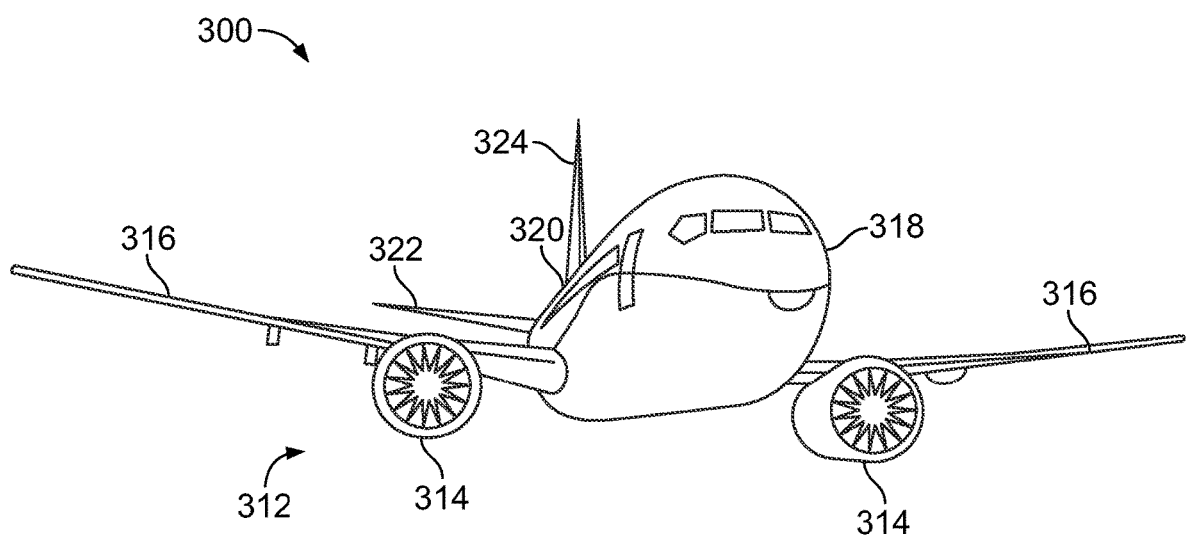
FIG. 4 illustrates a front perspective view of an aircraft, according to an example of the subject disclosure.

FIG. 4 illustrates a front perspective view of an aircraft 300, according to an example of the subject disclosure. Various portions of the aircraft 300 can be formed by or otherwise include component assemblies 100, as described with respect to FIGS. 1-3.

The aircraft 300 includes a propulsion system 312 that includes two engines 314, for example. The engines 314 can be or otherwise include electric motors. As another example, the engines 314 can be gas turbine engines. Optionally, the propulsion system 312 may include more engines 314 than shown. The engines 314 are carried by wings 316 of the aircraft 300. In other examples, the engines 314 can be carried by a fuselage 318 and/or an empennage 320. The empennage 320 can also support horizontal stabilizers 322 and a vertical stabilizer 324.

The fuselage 318 of the aircraft 300 defines an internal cabin, which may include a cockpit, one or more work sections (for example, galleys, personnel carry-on baggage areas, and the like), one or more passenger sections (for example, first class, business class, and coach sections), and an aft section. The aircraft 300 can be a commercial jet, for example. Optionally, the aircraft 300 can be a military aircraft, which can be configured differently than shown. As another example, the aircraft 300 can be an unmanned aerial vehicle (UAV). Optionally, examples of the subject disclosure can be used with various other types of vehicles, such as land-based vehicles (for example, automobiles, trains, and the like), sea-based vehicles (such as ships), spaced-based vehicles, and the like. Also, optionally, examples of the subject disclosure can be used with systems other than vehicles, such as buildings, appliances, furniture, and/or the like.

Further, the disclosure comprises examples according to the following clauses:

Clause 1. A component assembly, comprising:
  a core including a main body having a first surface and a second surface opposite from the first surface, wherein one or more recessed cells are formed in each of the first surface and the second surface of the main body, wherein the one or more recessed cells formed in the first surface extend toward the second surface, and wherein the one or more recessed cells formed in the second surface extend toward the first surface;
  a first layer secured to the core at a first adhesive layer; and
  a second layer secured to the core at a second adhesive layer.

Clause 2. The component assembly of Clause 1, wherein the core is formed of a composite material.

Clause 3. The component assembly of Clauses 1 or 2, wherein the one or more recessed cells formed in the first surface do not extend into or through the second surface, and wherein the one or more recessed cells formed in the second surface do not extend into or through the first surface.

Clause 4. The component assembly of any of Clauses 1-3, wherein the one or more recessed cells do not extend through an entire thickness of the core.

Clause 5. The component assembly of any of Clauses 1-4, wherein a laser device is configured to perform laser bond inspection at one or more areas defined by the one or more recessed cells to determine a strength of the first adhesive layer.

Clause 6. The component assembly of Clause 5, wherein the first layer is formed of a composite material.

Clause 7. The component assembly of Clauses 5 or 6, wherein the laser device is configured to perform the laser bond inspection at the one or more areas defined by the one or more recessed cells to determine a strength of the second adhesive layer.

Clause 8. The component assembly of Clause 7, wherein the second layer is formed of a composite material.

Clause 9. The component assembly of any of Clauses 1-8 1, wherein the one or more recessed cells comprise:
  an opening formed through the surface;
  one or more walls; and
  a base connected to the one or more walls, wherein the base is recessed into the main body of the core a depth that is less than a thickness of the core.

Clause 10. The component assembly of Clause 9, wherein the base is flat and parallel with the opposite surface.

Clause 11. The component assembly of Clauses 9 or 10, wherein the one or more walls are outwardly flared.

Clause 12. A method for testing one or more bondlines of a component assembly, the method comprising:
  forming one or more recessed cells in a first surface of a main body of a core, wherein the one or more recessed cells in the first surface extend toward a second surface that is opposite from the first surface;

forming one or more recessed cells in the second surface of the main body of the core, wherein the one or more recessed cells in the second surface extend toward the first surface;

securing a first layer to the core at a first adhesive layer; and securing a second layer to the core at a second adhesive layer.

Clause 13. The method of Clause 12, wherein the core is formed of a composite material.

Clause 14. The method of Clauses 12 or 13, wherein the one or more recessed cells formed in the first surface do not extend into or through the second surface, and wherein the one or more recessed cells formed in the second surface do not extend into or through the first surface.

Clause 15. The method of any of Clauses 12-14, wherein the one or more recessed cells do not extend through an entire thickness of the core.

Clause 16. The method of any of Clauses 12-14, further comprising using a laser device to perform laser bond inspection at one or more areas defined by the one or more recessed cells to determine a strength of the first adhesive layer.

Clause 17. The method of Clause 16, further using the laser device to perform the laser bond inspection at the one or more areas defined by the one or more recessed cells to determine a strength of the second adhesive layer.

Clause 18. The method of any of Clauses 12-17, wherein the one or more recessed cells comprise:

an opening formed through the surface;

one or more walls; and a base connected to the one or more walls, wherein the base is recessed into the main body of the core a depth that is less than a thickness of the core.

Clause 19. The method of Clause 18, wherein the base is flat and parallel with the opposite surface.

Clause 20. A composite component assembly, comprising:

a core formed of a composite material, the core including a main body having a first surface and a second surface opposite from the first surface, wherein one or more recessed cells are formed in each of the first surface and the second surface of the main body, wherein the one or more recessed cells formed in the first surface extend toward the second surface, and wherein the one or more recessed cells formed in the second surface extend toward the first surface, wherein the one or more recessed cells do not extend through an entire thickness of the core, wherein the one or more recessed cells comprise an opening formed through the surface, one or more walls, and a base connected to the one or more walls, wherein the base is recessed into the main body of the core a depth that is less than a thickness of the core, and wherein the base is flat and parallel with the opposite surface;

a first layer secured to the core at a first adhesive layer, wherein a laser device is configured to perform laser bond inspection at one or more areas defined by the one or more recessed cells to determine a strength of the first adhesive layer; and a second layer secured to the core at a second adhesive layer, wherein the laser device is configured to perform the laser bond inspection at the one or more areas defined by the one or more recessed cells to determine a strength of the second adhesive layer.

As described herein, certain examples of the subject disclosure provide an assembly that can be used as a secondarily-bonded primary structure that can be effectively inspected by laser bond inspection.

While various spatial and directional terms, such as top, bottom, lower, mid, lateral, horizontal, vertical, front and the like can be used to describe examples of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A component assembly, comprising:

a core including:

a main body having a first surface and a second surface opposite from the first surface, wherein one or more recessed cells are formed in each of the first surface and the second surface of the main body, wherein the one or more recessed cells formed in the first surface extend toward the second surface, wherein the one or more recessed cells formed in the second surface extend toward the first surface, and wherein the one or more recessed cells extend to a depth that is ⅔ or less an entire thickness of the core; and structural material directly contacting the one or more recessed cells, the first surface, and the second surface;

a first layer secured to the core at a first adhesive layer; and a second layer secured to the core at a second adhesive layer.

2. The component assembly of claim 1, wherein the core is formed of a composite material.

3. The component assembly of claim 1, wherein the one or more recessed cells formed in the first surface do not extend into or through the second surface, and wherein the one or more recessed cells formed in the second surface do not extend into or through the first surface.

4. The component assembly of claim 1, wherein a laser device is configured to perform laser bond inspection at one or more areas defined by the one or more recessed cells to determine a strength of the first adhesive layer.

5. The component assembly of claim 4, wherein the first layer is formed of a composite material.

6. The component assembly of claim 4, wherein the laser device is configured to perform the laser bond inspection at the one or more areas defined by the one or more recessed cells to determine a strength of the second adhesive layer.

7. The component assembly of claim 6, wherein the second layer is formed of a composite material.

8. The component assembly of claim 1, wherein the one or more recessed cells comprise:

an opening formed through one of the first surface or the second surface;

one or more walls; and a base connected to the one or more walls, wherein the base is recessed into the main body of the core at the depth.

9. The component assembly of claim 8, wherein the base is flat and parallel with the first surface and the second surface.

10. The component assembly of claim 8, wherein the one or more walls are outwardly flared.

11. The component assembly of claim 8, wherein the structural material contiguously extends from the base to the first surface or the second surface.

12. A method for testing one or more bondlines of the component assembly of claim 1, the method comprising:

providing a main body of a core having one or more recessed cells in a first surface that extend toward a second surface that is opposite from the first surface, and one or more recessed cells in the second surface that extend toward the first surface, wherein the one or more recessed cells extend to a depth that is ⅔ or less an entire thickness of the core, wherein the core further includes structural material directly contacting the one or more recessed cells, the first surface, and the second surface;

securing a first layer to the core at a first adhesive layer; and securing a second layer to the core at a second adhesive layer.

13. The method of claim 12, wherein the core is formed of a composite material.

14. The method of claim 12, wherein the one or more recessed cells formed in the first surface do not extend into or through the second surface, and wherein the one or more recessed cells formed in the second surface do not extend into or through the first surface.

15. The method of claim 12, further comprising using a laser device to perform laser bond inspection at one or more areas defined by the one or more recessed cells to determine a strength of the first adhesive layer.

16. The method of claim 15, further using the laser device to perform the laser bond inspection at the one or more areas defined by the one or more recessed cells to determine a strength of the second adhesive layer.

17. The method of claim 12, wherein the one or more recessed cells comprise:

an opening formed through the first surface or the second surface;

one or more walls; and a base connected to the one or more walls, wherein the base is recessed into the main body of the core at the depth.

18. The method of claim 17, wherein the base is flat and parallel with the first surface and the second surface.

19. A composite component assembly, comprising:

a core formed of a composite material, the core including a main body having a first surface and a second surface opposite from the first surface, wherein one or more recessed cells are formed in each of the first surface and the second surface of the main body, wherein the one or more recessed cells formed in the first surface extend toward the second surface, and wherein the one or more recessed cells formed in the second surface extend toward the first surface, wherein the one or more recessed cells extend to a depth that is ⅔ or less an entire thickness of the core, wherein the one or more recessed cells comprise an opening formed through the surface, one or more walls, and a base connected to the one or more walls, wherein the base is recessed into the main body of the core to the depth, and wherein the base is flat and parallel with the opposite surface, wherein structural material of the main body extends to and between directly contacts the one or more recessed cells, the first surface, and the second surface;

a first layer secured to the core at a first adhesive layer, wherein a laser device is configured to perform laser bond inspection at one or more areas defined by the one or more recessed cells to determine a strength of the first adhesive layer; and a second layer secured to the core at a second adhesive layer, wherein the laser device is configured to perform the laser bond inspection at the one or more areas defined by the one or more recessed cells to determine a strength of the second adhesive layer.

20. The component assembly of claim 19, wherein the structural material contiguously extends from the base to the first surface or the second surface.

* * * * *